United States Patent
Grundmann (10) Patent No.: US 11,543,346 B2
(45) Date of Patent: Jan. 3, 2023

(54) DEVICE FOR CONDUCTING RADIATION, A PHOTODETECTOR ARRANGEMENT, AND A METHOD FOR SPATIALLY RESOLVED SPECTRAL ANALYSIS

(71) Applicant: UNIVERSITÄT LEIPZIG, Leipzig (DE)

(72) Inventor: Marius Grundmann, Leipzig (DE)

(73) Assignee: UNIVERSITÄT LEIPZIG, Leipzig (DE)

( * ) Notice: Subject to any disclaimer, the term of this patent is extended or adjusted under 35 U.S.C. 154(b) by 52 days.

(21) Appl. No.: 17/268,021

(22) PCT Filed: Aug. 14, 2019

(86) PCT No.: PCT/EP2019/071821
§ 371 (c)(1),
(2) Date: Feb. 11, 2021

(87) PCT Pub. No.: WO2020/035530
PCT Pub. Date: Feb. 20, 2020

(65) Prior Publication Data
US 2021/0164892 A1    Jun. 3, 2021

(30) Foreign Application Priority Data

Aug. 14, 2018  (DE) .......................... 1020181197128

(51) Int. Cl.
*G01J 3/28* (2006.01)
*G01N 21/31* (2006.01)
*G01J 3/12* (2006.01)

(52) U.S. Cl.
CPC ............... *G01N 21/31* (2013.01); *G01J 3/12* (2013.01); *G01J 3/28* (2013.01); *G01N 2021/3125* (2013.01)

(58) Field of Classification Search
CPC ... G01N 21/31; G01N 2021/3125; G01J 3/12; G01J 3/28; G01J 2003/1213; G01J 3/0259; G01J 3/2803
See application file for complete search history.

(56) References Cited

U.S. PATENT DOCUMENTS

| | | |
|---|---|---|
| 5,784,507 A | 7/1998 | Holm-Kennedy |
| 2005/0205758 A1 | 9/2005 | Almeida |
| 2006/0138313 A1 | 6/2006 | Tennant |
| 2019/0072432 A1* | 3/2019 | Zandian ............ H01L 21/02562 |

FOREIGN PATENT DOCUMENTS

| | | |
|---|---|---|
| FR | 2894074 A1 | 6/2007 |
| WO | 2017005511 A1 | 1/2017 |

* cited by examiner

*Primary Examiner* — Abdullahi Nur
(74) *Attorney, Agent, or Firm* — Maschoff Brennan (57) ABSTRACT

The invention relates to a device for conducting radiation, a photodetector arrangement, and a method for spatially resolved spectral analysis.

13 Claims, 3 Drawing Sheets

VORRICHTUNG ZUR LEITUNG VON STRAHLUNG,

DEVICE FOR CONDUCTING RADIATION, A PHOTODETECTOR ARRANGEMENT, AND A METHOD FOR SPATIALLY RESOLVED SPECTRAL ANALYSIS

The invention relates to a device for conducting radiation, a photodetector arrangement, and a method for spatially resolved spectral analysis.

PRIOR ART

In prior art, conventional spectrometers, which typically have a dispersive element and/or an optical path, are known for detecting a spectrum. The dispersive element is typically used to sort the incident radiation by wavelength. Gratings or prisms are typically used as dispersive elements. The radiation sorted by wavelength or the radiation components can then be imaged on various sites of a stationary photodetector array, allowing a spectral analysis of the radiation to be examined. Alternatively, a photodetector can be used in which the dispersive element can be moved. The movement can be a rotation, for example. This typically requires complex mechanics. The disadvantage of such a device having a dispersive element or optical path is that such devices are often very large and unwieldy for this reason. Particularly if such a device is to be installed in a smaller electrical or electronic device, it would be desirable if a space-saving and compact design of the spectrometer were available. An example of a spectrometer which works using a lens arrangement, for example, is disclosed in US 2012/026 8745 A1. The disadvantage of conventional devices described in prior art is that a large amount of radiation intensity available to each detector is lost if the radiation to be examined is distributed over a series of detectors which differ in spectral sensitivity.

Furthermore, spectrometers having microfabricated dispersive elements such as gratings or arrayed waveguides are known from prior art. In these devices, the radiation to be examined is sorted by wavelength onto a chip and then detected using various photodetectors. Such devices are mostly suited for examinations in small wavelength ranges, however. For example, U.S. Pat. No. 8,282/882 B2 discloses a microspectrometer in which two shell layers of a waveguide are connected by a slot, wherein the slot may be filled with the material of which the upper layer is made.

Spectrometers including a waveguide are known from GB 2470115 A and EP 2 766 757 B1 with microdisc resonators arranged along its extension. A wavelength dependent resonance condition can be defined based on the dimensioning or material composition of the resonators. Only light with a wavelength that meets the resonance condition will effectively couple into the respective resonator and can be read out as a photosignal. The resonators are characterized by narrow resonance conditions which ensure a high spectral resolution. For applications intended for spectral detection over greater ranges, such as 300 nm or more, such approaches are not suitable or require a complex design. It is accordingly the problem of the present invention to provide a device for conducting radiation, a photodetector arrangement, and a spectral analysis method which do not have the disadvantages and shortcomings of prior art. The device should make do without a space-consuming dispersive element and without an optical path to provide a compact spectrometer device which can be installed, for example, in mobile devices such as smartphones or tablets. It would be desirable if a particularly compact device could be provided which still covers a spectral range and spectral resolution comparable to the conventional devices. Particularly, spectral analysis should not depend on thermal and/or statistical effects, but rather on the selection and design of the material and the structure of the device or the individual components of the device, respectively. Furthermore, it should be possible to use the device and the method to measure a large range of wavelengths.

DESCRIPTION OF THE INVENTION

This problem is solved by the features of the independent claims. Advantageous embodiments of the invention are described in the dependent claims. According to the invention, a device for conducting radiation is provided which includes an absorption element. The device is characterized in that the absorption element has a varying chemical composition along its extension. It is preferred that he device for conducting radiation is characterized in that a continuous material gradient is present along the extension of the absorption element in order to vary the energetic position of an absorption edge continuously along the extension of the absorption element.

It is preferred for the purposes of the invention that the device is designated and/or functions as a waveguide. The device is therefore particularly used for conducting radiation that is coupled into the waveguide or is present therein. The absorption element can also preferably be called an absorber for the purposes of the invention. It is preferred for the purposes of the invention that the proposed device can be used as a spectrometer. It is further preferred to use the proposed device as a wave meter. It is very particularly preferred for the purposes of the invention that the proposed device is adapted for use in spatially resolved spectral analysis, such that the device can, for the purposes of the invention, preferably be called a device for spatially resolved spectral analysis.

An absorption element for the purposes of the invention is preferably a component for the absorption of electromagnetic radiation, wherein a photosignal can be generated due to the absorption. The term absorption element is preferably understood as standing for absorption elements made of photoconductive materials, i.e. materials which become more electrically conductive when absorbing electromagnetic radiation. If electromagnetic radiation is for example absorbed by a semiconductor, the band gap of which is smaller than the photon energy of the electromagnetic radiation, the number of free electrons and electron holes increases, such that conductivity increases. If an electric voltage is applied to an absorption element, e.g. by means of two contacts, the absorption electromagnetic radiation, which may be wavelength dependent, can directly be registered as an increase of a photosignal or photocurrent. Photosignals are thus preferably electrical signals which become detectable by the absorption element when an electromagnetic radiation is absorbed. Photosignals are preferably photocurrents.

The feature that the absorption element has a varying chemical composition can in other words be described as a material gradient along the absorption element. The invention represents a turn away from prior art in that the experts have always endeavored to provide particularly homogeneous alloy systems in order to achieve the typically desired homogeneous material properties. Particularly the use of a constantly changing composition gradient in a semiconductor alloy turns away from the known heterostructures in which two different concentrations inside the component are used to implement different functions of the component.

This takes place, for example, in so-called quantum wells in which the "barrier" and the "well" are implemented by different concentrations. The present invention, however, turns away from such components having two different material and/or element concentrations in that particularly a material gradient inside the absorption element is proposed which shows a continuous, for example, linear or substantially linear, change.

Providing the material gradient inside the absorption element advantageously allows mapping the absorption to a specific location along the absorption element or waveguide. This allows particularly exact spatially resolved spectral analysis of the radiation to be examined and coupled into the waveguide. Provision of the particularly exact spectral analysis is achieved in the context of the present invention by providing a material gradient in the absorption element which advantageously influences the absorption behavior of the absorption element such that local mapping of wavelength and detection site is made possible. This mapping option allows eliminating a dispersive element in the proposed device, which dispersive element experts had as yet deemed required for devices of this generic type. In this respect, the invention also turns away from the development described in prior art. Preferably, a use of the waveguide for carrying out a spatially resolved spectral analysis or a use of the waveguide in a photodetector application is also disclosed.

For example, an array of N-photodetectors can be present along the extension of the absorption element, which in their totality are adapted to detect the varying absorption of the radiation. Since the wavelength dependence of radiation absorption varies along the extension, the spectrum can be determined by a spatially resolved measurement of photocurrents $I_1$ to $I_N$.

According to the invention, it was found that the energetic position of the absorption edge can be varied along the extension of the absorption element by means of a continuous material gradient.

For the purposes of the invention, the term "absorption edge" designates a preferably sharp, i.e., sudden, transition between different absorption states or strengths. For example, this can mean a region in a preferably electromagnetic spectrum in which an abrupt difference occurs between a region of strong absorption and a region of weak absorption. The absorption edge of a material, particularly a semiconductor with a direct band structure preferably corresponds to a spectral region in which the absorption coefficient $\alpha$ rises from low values in the transparency range, typically less than 1 bis 10 $cm^{-1}$, to large values, typically $10^4$ bis $10^5$ $cm^{-1}$. The transparency range preferably designates a spectral region for photon energies smaller than the absorption edge, while an absorption range characterizes a spectral region for photon energies greater than the absorption edge.

The term "absorption coefficient" should be interpreted in the typical sense. It is known that the absorption of light can be described by an absorption coefficient $\alpha$ which describes the weakening of light intensity when passing through an absorbing medium in accordance with Lambert-Beer's absorption law. It says that the intensity after passing through the material having a thickness d is reduced by the factor $\exp(-\alpha d)$. The unit of $\alpha$ therefore is 1/length; $\alpha$ is typically expressed in $cm^{-1}$.

The energetic position of the absorption edge is also called spectral position and preferably refers to the photon energy at which the sudden transition between different absorption states or strengths occurs. Spectral position preferably means the starting and end points of an absorption edge (for example 3.25 eV and 3.5 eV), but the spectral position can also be characterized by a mean value of the starting and end points or the point of the steepest rise.

In compound semiconductors (such as GaAs, InP, ZnO) with a direct band structure, the width of an absorption edge is relatively small, typically in a range of 30 meV photon energy or the respective waveguide region. In a semiconductor with an direct band structure, light can be absorbed without involving lattice vibrations, which preferably results in a steep absorption edge. Absorption rises more slowly in semiconductors with an indirect band structure, but is limited depending on the material.

There are some mechanisms which require the exact spectral form of a steep rise of the absorption coefficient, particularly for direct semiconductors at the absorption edge. At low temperatures, so-called "excitonic" effects contribute, at high temperatures, scattering at lattice vibrations. The typical temperatures of these effects depend on the semiconductor and its band gap. In general, it can be assumed that the absorption edge is widened at room temperature due to thermal effects. In solid state solutions or alloy semiconductors, the lattice sites of the cation or anion lattice or both lattices are occupied by different elements. Examples include (Al,Ga)As, Ga(As,P). or (Al,Ga)(As,P). Solid state solutions or alloy semiconductors having more than 4 elements are possible as well, of course. In this way, a steady change of the material properties can be achieved between the binary end components (that is, compound semiconductors of only two elements).

Such solid state solutions are used in many semiconductor heterostructures, that is, structures in which multiple semiconductor layers are stacked on top of each other. Examples include light emitting diodes, semiconductor lasers, transistors (HEMT), or multi-junction solar cells.

The spectral position of the absorption edge can be specified using a solid state solution or a semiconductor alloy. According to the invention, it is proposed to incorporate a chemical gradient or material gradient in the absorption element to vary the spectral position of the absorption edge based on location along the extension. The preferred variation is from a higher-energy absorption edge (e.g. at about 3.8 eV) in a front region to a lower-energy absorption edge (e.g. at about 3.3 eV, see FIG. 3).

The spectral position of the absorption edge preferably varies with the local chemical concentration of the components of a semiconductor mixture.

By suitably selecting the starting and end values of the concentration gradient and its functional shape (linear or non-linear, e.g. square), the absolute spectral position of the absorption edge along the extension of the absorption element can advantageously be specified.

A substantial advantage of the structure according to the invention is that the spectral position (and optionally, the width) of the absorption edge can be specified by selecting a material gradient to allow for location-dependent spectral analysis.

Depending on the selection of the semiconductor materials, the absorption edge is in the infrared (IR), visible range (VIS), or in the ultraviolet range (UV). The spectral position of the absorption edge follows the course of the band gap $E_g$ as a function of chemical variation. If x indicates the chemical variation, $E_g(x)$ is the course of the band gap as a function of chemical variation. If the chemical concentration varies along the extension of the absorption element from $x_1$ to $x_2$, the spectral position of the absorption edge can preferably vary substantially from $E_g(x_1)$ to $E_g(x_2)$.

Thus the use of a continuous material gradient in the absorption element allows the provision of a spectrometer with a large detection range, for example from 300 meV, 400 meV, 500 meV or more, wherein the spectral position of the absorption edge is varied for this purpose by varying the chemical concentration over a range of 300 meV, 400 meV, 500 meV or more.

In a preferred embodiment, the absorption element comprises a higher-energy position of the absorption edge in a front region than in a rear region. The front region preferably designates that region that faces the radiation entry, that is, the input region for the radiation to be examined, while the rear region is facing the output side.

Higher-energy means that the spectral position of the absorption edge is present at a higher energy than in the rear region (for example at 4 eV instead of 3.2 eV, see FIG. 3), such that initially only higher-energy or high-frequency radiation is absorbed in the front region, i.e, that portion of radiation that has a photon energy above the absorption edge.

Such a configuration preferably ensures that the radiation increasingly loses high-energy portions as it propagates through the device and the spectrum of the radiation shifts toward lower energies.

It is preferred for the purpose of the invention that the absorption element comprises a material that is a binary, ternary, or quaternary semiconductor alloy. The absorption element of the material can particularly comprise a binary, ternary, or quaternary semiconductor alloy material. This preferably means for the purpose of the invention that the absorption element comprises a material that is at least partially formed of a semiconductor alloy, wherein the alloy preferably consists of two, three, or four alloying components. An example of a ternary alloy is (Mg,Zn)O, i.e. an alloy of magnesium, zinc, and oxygen. The absorption element can preferably comprise (Mg,Zn)O, or the material of the absorption element can be formed by (Mg,Zn)O. The use of a (Mg,Zn)O alloy is particularly advantageous if radiation in the near UV range is to be examined. It is particularly preferred for the purpose of the invention that the wavelength range to be examined is determined by the suitable selection of materials of the absorption elements.

Other potential alloys include $(In,Ga)_2O_3$ and $(Al,Ga)_2O_3$, which may for example be deposited by evaporation onto a sapphire substrate. The material for the absorption element can further be selected from a group including (Ge,Si), (Ge,Si)C, (In,Ga)As, (Al,Ga)As, (Al,Ga,In)(As,P), (In,Ga)N, (Al,Ga)N, (Al,In,Ga)N, (Cd,Zn)O, and/or Zn(O,S), wherein the various materials preferably allow the examination of different spectral regions. The material for the absorption element can in furthermore be selected from a group including (Al,Ga,In)As, (In,Ga)(As,P), (Al,Ga,In)N, (Mg,Zn,Cd)O, and/or $(Al,Ga,In)_2O_3$. The absorption element can preferably be composed of more than one alloy material. For example, a front region of a waveguide can comprise a (Mg,Zn)O material and a rear region of the waveguide can comprise a (Zn,Cd)O material. Such a waveguide can for example be used to detect particularly low photon energies in the rear portion of the waveguide. The transition between the different materials can for example be fluid. For example, the absorption element can have multiple material gradients. Such a structure is preferably called a layered structure of multiple gradient layers for the purpose of the invention.

It is particularly preferred for the purpose of the invention that the absorption element comprises alloy semiconductors in which a change of the chemical composition is accompanied by a change in band gap and/or absorption edge. Tests have shown that this condition is met, particularly by the materials proposed in the context of the invention. The material for the absorption elements can alternatively be selected from a group including (Mg,Zn)O, $(In,Ga)_2O_3$, (Si,Ge), (Si,Ge)C, $(Al,Ga)_2O_3$, (In,Ga)As, (Al,Ga)As, (In,Ga)N, (Al,Ga)N, (Cd,Zn)O, Zn(O,S), (Al,Ga,In)As, (Al,In,Ga)P, (Al,In,Ga)(As,P), (Al,Ga,In)N, (Mg,Zn,Cd)O, and/or $(Al,Ga,In)_2O_3$, wherein $(In,Ga)_2O_3$ and $(Al,Ga)_2O_3$ are preferably arranged on a sapphire.

In a preferred embodiment, the absorption element comprises a semiconductor alloy of a direct semiconductor, particularly preferably selected from the group of (Mg,Zn)O, $(In,Ga)_2O_3$, $(Al,Ga)_2O_3$, (In,Ga)As, (Al,Ga)As, (In,Ga)N, (Al,Ga)N, (Cd,Zn)O, Zn(O,S), (Al,Ga,In)As, (Al,In,Ga)P, (Al,In,Ga)(As,P), (Al,Ga,In)N, (Mg,Zn,Cd)O, and/or $(Al,Ga,In)_2O_3$, wherein a person skilled in the art knows that a semiconductor alloy comprising Al and Ga can, depending on the proportions of Al and Ga, preferably be a direct or indirect semiconductor with a respective direct or indirect band gap.

It is preferred for the purpose of the invention that the spectral sensitivity range of the waveguide depends on the semiconductor material used and its design, particularly the design of the absorption element and the absorption edge. In this respect, the invention facilitates adjustability of the sensitivity range of the waveguide or spectrometer by a suitable material selection. The absorption behavior of the absorption element can thus advantageously be adjusted by a suitable selection of the semiconductor material. The absorption behavior of the absorption element is particularly adjustable by the design of the material gradient within the absorber. It can be preferred in the context of the present invention to combine multiple material gradients along a waveguide or absorption element, respectively. In this way, a greater spectral range or different spectral ranges can surprisingly be covered.

The term of "varying chemical composition," in the context of the present invention, preferably means that the absorption element has a varying composition along its extension. For example, the material of which the absorption element is formed can have a greater band gap in a front region, which may for example be used as input region for the radiation to be examined, than in a rear region. The material can have a greater magnesium content in the input region, wherein the proportion of magnesium declines along the absorption element towards the output region, thereby increasing the proportion of zinc. For example, the composition of the (Mg,Zn)O alloy system can be described by the $Mg_xZn_{1-x}O$ specification, such that more magnesium results in less zinc.

In a preferred embodiment of the invention, the material gradient is formed by varying the proportions of the alloy components of a semiconductor alloy along the extension of the absorption element.

In another preferred embodiment of the invention, the absorption element comprises a semiconductor alloy of the general form $A_xB_{1-x}$, wherein A and B each represent alloy components and x is the proportion of A in the semiconductor alloy, which is varied along the extension of the absorption element.

It can also be preferred for the purpose of the invention that the absorption elements comprise binary, ternary, or quaternary alloys, wherein the concentrations or proportions of each alloy component are linked to each other via an index x. Depending on the selected material system of an exemplary alloy comprising the alloy components A and B, the index x for the alloy $A_xB_{1-x}$ can preferably run from 0 to 1 or assume a value between 0 and 1. Intermediate values, such as 0 to 0.9, 0.8, 0.7, 0.6, 0.5, 0.4, 0.3, 0.2, or even 0.1 can be preferred: Likewise, it can be preferred to let x run between 0.1, 0.2, 0.3, 0.4, 0.5, 0.6, 0.7, 0.8, or 0.9 to 1.0. Any combination, for example 0.2 to 0.5 or 0.1 to 0.3 is conceivable as well. The general form $A_xB_{1-x}$ can be applied to binary, ternary, or quaternary alloys. For example, the alloy components A and B can also characterize a semiconductor mixture, or the absorption element comprises a semiconductor alloy with three or more alloy components, wherein only the proportions of two alloy components are varied.

For the particularly preferred exemplary embodiment, $Mg_xZn_{1-x}O$, the presence of a chemical material gradient within the absorption element can preferably express itself in that the index x, varying from a front region to a rear region, assumes a value between 0.3 to 0.0, wherein the value x=0.3 is for example assumed in a front region of the absorption element, which for example corresponds to an input region of the radiation to be examined, and the value x~0.0 is assumed in a rear region of the absorption element.

It is preferred for the purpose of the invention that the material gradient is substantially linear, wherein "substantially" is not unclear to a person skilled in the art, since the person skilled in the art known the range of precision in which the concentrations in an alloy system can be adjusted.

Terms such as substantially, about, approximately, ca., etc. preferably describe a tolerance range of less than ±20%, preferably less than ±10%, more preferably less than ±5%, and particularly less than ±1%. Indications of substantially, approximately, about, ca., etc. always disclose and include the exact value indicated.

For individual applications, non-linear courses of the material gradient, e.g. square ones, can be preferred. These can for example be represented in the following form:

$$x=x_0+x_1 \cdot d+x_2 d^2,$$

wherein the $x_i$ preferably represent coefficients which are preferably constant.

A linear course, for example as $$x=x_0+x_1 \cdot d$$

can be preferred as well.

It can be preferred for some applications that the course of the material gradient is described by a function $$x=x_0+x_1 \cdot d+x_2 \cdot d^2+x_3 \cdot d^3$$

wherein the $x_i$ preferably represent coefficients which are preferably constant. Such a Taylor series can be used to represent any non-linear function.

In a preferred embodiment of the invention, the material gradient along the extension of the absorption element is varied in a monotonously rising or falling manner, wherein the material gradient preferably shows a linear or square dependency on the position along the extension of the absorption element.

It is preferred for the purpose of the invention that an absorption of radiation components of the radiation to be examined and coupled into the waveguide by the absorption element takes place depending on the material, the chemical composition of the absorption element, the design, the arrangement of the device or the components of the device, and depending on the properties of the radiation. The absorption element is preferably configured to absorb the radiation to differing degrees along the extension of the device depending on at least one property of the radiation. The properties of the radiation can preferably be the frequency f or the wavelength λ of the radiation. It is particularly preferred for the purpose of the invention that the absorption releases charge carriers in the absorption element. Different amounts of charge carriers are released depending on the quantity, energy, and/or intensity of the absorbed radiation, wherein the charge carriers can also comprise different particle energies. These particle energies are preferably expressed in electron volts (eV) as a unit.

It is particularly preferred for the purpose of the invention that the material of the absorption element preferably comprises a sharp absorption edge at each point. It is particularly preferred for the purpose of the invention that the absorption edge varies its energetic position along the waveguide. The material of the absorption element preferably has a large band gap in the front region, for example in the input region of the waveguide, whereby the radiation with the greatest photon energy is preferably absorbed in this region. It is preferred for the purpose of the invention that primarily the portions of radiation with the higher proton energies are absorbed from the radiation as the radiation propagates through the waveguide. This changes the spectrum of the radiation, since it increasingly loses its high-frequency portions along the waveguide, such that the spectrum preferably shifts towards lower photon energies. It is particularly preferred for the purpose of the invention that radiation of lower photon energy is absorbed in the rear region of the wave guide, wherein a remaining residue of the radiation is transmitted.

Absorption preferably starts at a specific photon energy at the location within the waveguide where the photon energy matches the size of the band gap of the material of the absorption element. A photodetector or multiple photodetectors could be provided at this location to detect the start of the absorption.

Application tests have shown that, unlike prior art, the invention does not involve any major influencing of the absorption edge of the absorption element by thermal and/or statistical effects, but that it is determined by the material composition or design of the material gradient. It is particularly preferred for the purpose of the invention that the performance parameters of the invention do not depend on thermal and/or statistical effects but on the design of the material of which the absorption element is formed, or on the design of the material gradient within the absorption element.

It is preferred for the purpose of the invention that the various spectral portions of the incident radiation are sorted in the waveguide and then detected using the photodetector array. Local mapping is particularly performed in the absorption element which comprises a material gradient. This allows to provide an unmoving and very compact design. In addition, the entire radiation is preferably translated into a photosignal in the relevant spectral region, such that the proposed device is particularly efficient compared to conventional devices.

It is preferred for the purpose of the invention that the radiation to be examined is coupled into the waveguide or the absorption element, respectively. The radiation can for example be coupled into the waveguide by adjusting a glass fiber or by focusing into the waveguide. The radiation to be examined preferably is radiation in the infrared (IR), visible, and/or ultraviolet (UV) wavelength range. The radiation to be examined can for example be IR, UV radiation, visible light, or laser radiation, the radiation preferably being non-monochromatic. The wavelength distribution can preferably be arbitrary, wherein one peak or multiple peaks may be preferred, It is preferred for the purpose of the invention that the radiation to be examined is electromagnetic radiation.

It is preferred for the purpose of the invention that the absorption behavior of the absorption element changes as the composition of the material changes due to the material gradient provided within the absorption element or along the same. In other words, the change in the chemical composition of the absorber causes a change of the absorption edge of the absorption element. This advantageously also changes the spectrum during the propagation of the radiation through the waveguide or along the absorption element. It is preferred for the purpose of the invention that the absorption element is configured such that short-wave radiation portions are absorbed in a front region of the waveguide or absorption element. The front region preferably is in the spatial vicinity of the input region of the waveguide.

The term "short-wave radiation" can be understood as radiation having a relatively short wavelength for the purpose of the invention, wherein a short wavelength $\lambda$ is linked by the relationship $$c = f \lambda$$

to a high frequency f and high radiation energy; the letter c stands for the speed of light in this equation. The absorption element is preferably configured such that long-wave radiation is absorbed in a rear region of the absorption element, wherein the chemical composition of the absorption element and its absorption behavior preferably change continuously and steadily rather than suddenly and abruptly. It is preferred for the purpose of the invention that the absorbed radiation can be decoupled from the waveguide in a rear region of the waveguide.

It is preferred for the purpose of the invention that photodetectors which can be arranged on and/or around the waveguide form a photodetector arrangement, wherein the photodetectors or photodetector arrangement are adapted to register the released charge carriers, their number and/or their energies along the waveguide and/or the absorption element. In a second aspect the invention thus relates to a photodetector arrangement comprising a proposed device, wherein a number of N photodetectors is present along the device, which in their totality are adapted to detect a varying absorption of radiation by the absorption element along the extension of the device.

The photodetector arrangement can also preferably be called a spectrometer for the purposes of the invention.

The photodetector arrangement or the photodetectors can preferably be used to detect or examine a radiation which is conducted through the arrangement. This advantageously creates an opportunity for spatially resolved spectral analysis of radiation coupled into the waveguide. The photodetector arrangement can preferably also be used as a spectrometer, and it is a special benefit of the invention that this arrangement allows the provision of a particularly compact spectrometer, since it can do without a dispersive element and without an optical path.

It is preferred for the purpose of the invention that the number of N photodetectors is in a range from 50 to 10,000, preferably in a range from 100 to 3,000, and particularly preferably on a range from about 200 to 1,000. Tests have shown that particularly devices having 200 to 1,000 photodetectors have a particularly good relationship between the size of the device and the wavelength range covered. It is preferred for the purpose of the invention that the number of detectors depends on the speed with which the spectrum of the radiation is to be examined. It is further preferred that the number of detectors depends on the number of spectral channels to be detected. The number of detectors preferably correlates with the length of the waveguide. In other words, the number and size of the detectors determines the length of the waveguide.

For example, photodetectors can be arranged at regular intervals along the waveguide and/or the absorption element, which photodetectors are adapted to register the charge carriers. Due to the regular arrangement of the photodetectors, the radiation to be examined can be examined at a spatial resolution with respect to the wavelength portions contained therein. It is a major advantage of the present invention that the configuration of the proposed waveguide is such that substantially all photons coupled into the waveguide are absorbed and can thus contribute to the spectral analysis or be evaluated for this purpose. By including substantially all photons of the coupled in radiation in the spectral analysis, a particularly efficient component can be provided. This is particularly achieved in that substantially the entire radiation is preferably converted into a photoresponse. As a result, signals of great signal strength are preferably obtained that can be processed particularly well and allow particularly exact analysis of the data collected. It is a major advantage of the present invention that the radiation does not have to be split up for examination in the context of the invention, but that examination of the light incident in a waveguide is possible, an examination which substantially includes all photons coupled in.

In a preferred embodiment, the photodetector arrangement or the spectrometer comprises a data processing device, which is adapted to determine the spectrum of the radiation based on the photocurrents measured at the photodetectors.

The data processing device is preferably a unit which is suitable and configured to receive, send, store, and/or process data, preferably of photocurrents or other measured data. The data processing unit preferably comprises an integrated circuit, a processor, a processor chip, microprocessor, and/or microcontroller for processing data, as well as a data memory, such as a hard disc, a random access memory (RAM), a read-only memory (ROM), or a flash memory for storing the data.

For carrying out the determination of the spectrum of the incident radiation based on measured photocurrents of the photodetectors, a software, firmware, or a computer program can preferably be present on the data processing device, which program comprises commands to execute the steps disclosed in connection with the method.

The data processing device can for example be a microprocessor which is compact and can be installed in a housing with the photodetector arrangement or spectrometer. But also a personal computer, a laptop, a tablet or the like is conceivable, which in addition to means for receiving, sending, storing, and/or processing data also include a display of the data as well as input means, such as a keyboard, a mouse, a touchscreen, etc. A person skilled in the art realizes that preferred (calculation) steps which are disclosed in connection with the method can also preferably be performed by the data processing device.

For example, the data processing device can preferably be adapted to perform unfolding or deconvolution methods and/or deconvolution process steps in order to perform a spatially resolved spectral analysis of a radiation coupled into the waveguide based on the measured photocurrents. As the basis for unfolding, calibration data can be stored on the data processing device, which for example correspond to the location-dependent photocurrents in response of the photodetector arrays to incident monochromatic radiation of different wavelengths.

Furthermore, the proposed waveguide also allows time resolved spectral analysis of the radiation to be examined and coupled into the waveguide. Tests have shown that a particularly high time resolution can surprisingly be achieved for time-dependent signals, wherein the time resolution can preferably go down to the picosecond range. It is a special merit of the invention that a particularly high time resolution can be achieved in addition to the spectral resolution. This means that the functionality of a streak camera can advantageously be provided by the invention. It is in line with the purpose of the invention to map a number of proposed waveguides substantially parallel to each other, thereby forming an array of waveguides which can preferably be used as a hyperspectral imaging detector. Advantageously, such a detector can be used to measure linear or one-dimensional distributions of spectra. Preferably, the one-dimensional distributions for the purpose of the invention are also called 1D distributions. Spatially and spectrally resolved measurements can be carried out due to the parallel arrangement of proposed waveguides. It was particularly surprising to the expert community that the present invention provides a monolithic, waveguide-based approach to a photodetector arrangement with which spatially and spectrally resolved measurements can be performed.

By stacking linear arrays of such waveguides, areal or two-dimensional arrays of hyperspectral imaging detectors can be achieved. Preferably, two-dimensional arrays for the purpose of the invention are called 2D- or pictorial arrays. By means of the respective further processing of the photoresponse data, the invention facilitates the measurement of 1D- or 2D-distributions of spectral features, such as wavelength of the spectral maximum, width of the spectrum, and lines or images in specific wavelength ranges. This information can in addition be determined at a high temporal resolution, which is particularly determined by the speed and/or bandwidth of the photodetectors.

Providing photodetectors spatially close to the proposed waveguide for forming a photodetector arrangement, preferably allows the conversion of the locally absorbed radiation into a so-called photoresponse, wherein the photoresponse can for example be formed by a photocurrent. It is preferred for the purpose of the invention that a photo current is a current which flows because of irradiation of the absorption element. The photocurrent is preferably formed by the released charge carriers. It is preferred for the purpose of the invention that the spectrum of the radiation to be examined can be reconstructed, at least approximately, from the lateral distribution of the photoresponse along the waveguide and/or the absorption element.

It is particularly preferred that the photodetector arrangement comprising a proposed waveguide is used as a spectrometer for the analysis of an desired incident spectrum. The device can preferably also be used as a wave meter, wherein a wave meter preferably is a device adapted to determine and/or detect a wavelength and/or photon energy of a radiation. It is a particular advantage of the invention that measurement of the wavelength of the incident radiation is made possible in a particularly large wavelength range. The particularly large wavelength range particularly surprises when compared to the preferred small size of the invention, which is made possible because the present invention can do without a dispersive element or an optical path.

Figure 2:
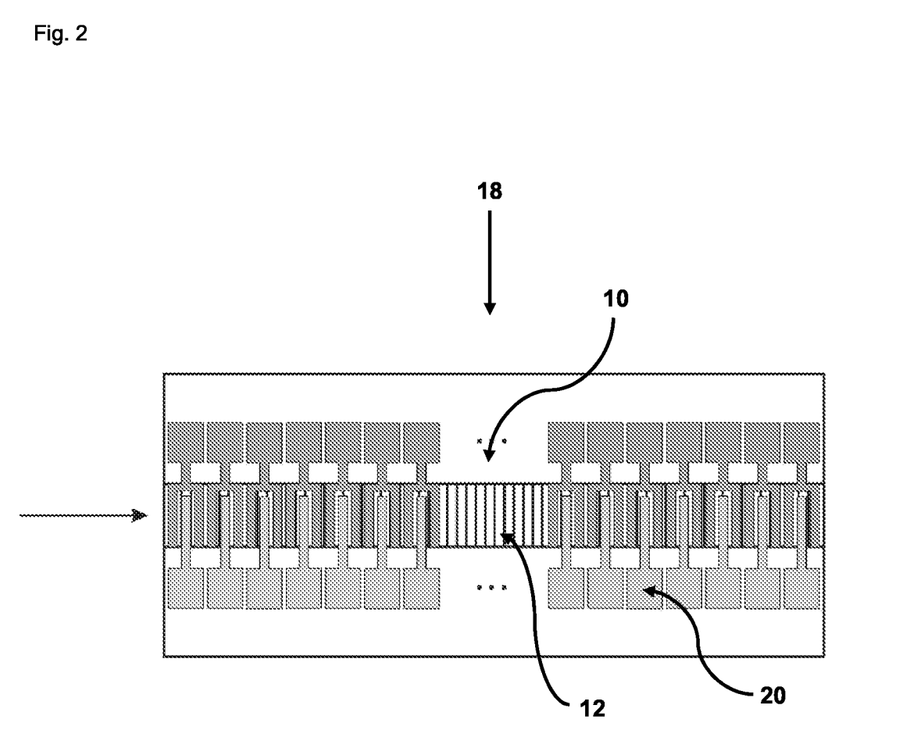
FIG. 2 shows a schematic top view of a preferred embodiment of the invention

It is preferred for the purpose of the invention that the photodetectors can be selected from a group comprising Schottky diodes, MSM diodes, pn diodes and/or photoconductors, without being limited thereto. Due to the higher flexibility in the selection of photodetectors, the invention can particularly easily be adapted to different application requirements and is thus quite versatile. An exemplary embodiment of the photodetector arrangement is shown in FIG. 2.

Another advantage which is connected to the proposed waveguide device and the proposed photodetector arrangement is that a particularly small spectrometer device can be provided, which can surprisingly be installed even in mobile electronic devices, such as smartphones, tablets, or mobile phones. The advantage to provide an ultracompact spectrometer device is particularly achieved in that the proposed device can do without an optical path and without a dispersive element. In other words, the proposed waveguide arrangement and the proposed photodetector arrangement do not comprise a dispersive element and no optical path. A dispersive element can for example be a be a diffraction gate or a prism. A person skilled in the art knows, which other optical elements can be called "dispersive elements." Since a dispersive element can be omitted in the present invention, it becomes possible to provide a particularly compact and space-saving spectrometer device, which despite its compact design is surprisingly adapted to spectrally analyze radiation over a very large wavelength range. This is a turn away from prior art in that the experts had so far assumed that the size of the spectrometer correlates with the wavelength range of the incident radiation to be analyzed later, or that greater devices are particularly required to be able to analyze radiation in a large spectral range.

It is preferred for the purpose of the invention that the absorption element is made using methods of pulsed laser deposition (PLD). In this way, precisely one material gradient can advantageously be set within the absorption elements in that the composition within the absorption element is varied along the waveguide. It can also be preferred for the purpose of the invention to produce the material gradient using other methods, such as sputter deposition, which is preferably also called cathodic sputtering, molecular beam epitaxy, and/or chemical deposition methods.

It is particularly preferred for the purpose of the invention that the concentration of each component of the alloy which forms the absorption element, has a gradient. It can be particularly preferred for the purpose of the invention that the material gradient is produced in the absorption element using methods of ion implantation. Tests have shown that ion implantation methods yield particularly strong material gradients, allowing to reduce the length of the proposed waveguide to a submillimeter range. Otherwise, various production methods are conceivable, as long as these allow the production of a material gradient. The absorption element is preferably configured as a thin layer (thin-layer technology) and is present on a substrate, which can for example be formed by a silicon wafer. It can be preferred for some applications that the substrate comprises sapphire, silicon, germanium, SiC, $G_2O_3$, $SrTiO_3$, GaAs, InP, GaP, or glasses.

In preferred embodiments of the invention, the device or the waveguide of the device and the absorption layer with a lateral material gradient is produced with methods of molecular beam epitaxy (MBE) or chemical gas vapor deposition (CVD) or cathode sputtering or pulsed laser deposition (PLD). Otherwise, various production methods are conceivable, as long as these allow the production of a lateral material gradient.

A continuous lateral material gradient (gradient of the chemical composition of the waveguide or the absorption element) is preferably produced in a film deposition process through suitable control of the provision of various chemical elements and controlling the site of their deposition. This can be done, for example, by controlling the local position of the laser focus on the ablation target in pulsed laser deposition, if the target is radially segmented, and accordingly synchronized rotation of the substrate. Various positions of the laser on the target result in ablated material with different chemical composition (see Holger von Wenckstern, Zhipeng Zhang, Florian Schmidt, Jörg Lenzner, Holger Hochmuth, Marius Grundmann, *Continuous composition spread using pulsed-laser deposition with a single, segmented target*, CrystEngComm 15, 10020-10027 (2013)). A continuous material gradient can for example be achieved using the method steps disclosed by Holger von Wenckstern et al. Other methods of producing a lateral material gradient are known, which use movable masks, among other things (e.g. Marc D. Porter, *Combinatorial Materials Science* (John Wiley & Sons, Hoboken, N.J., 2007)).

Such methods can particularly be used to produce waveguides with lengths in the range of 1 cm, preferably smaller than 1 mm, wherein waveguides with such small dimensions can advantageously be installed in mobile devices, such as smartphones or tablets. The absorption element can particularly have a length in a range from 50 µm to 20 mm, preferably in a range from 100 µm to 10 mm. The waveguide can particularly have a length in this preferred range of lengths.

These values are particularly preferred in such semiconductor materials having a direct band structure and a steep absorption edge. It is preferred for the purpose of the invention that the length of the waveguide depends on the absorption capacity and particularly on the thickness of the absorption film within the waveguide. For example, a waveguide length of a few millimeters can be preferred when using (Si,Ge) as the semiconductor material. It is particularly preferred for the purpose of the invention that the waveguide is made at a length that allows the arrangement of a large number of photodetectors along the waveguide, such that a particularly good spectral resolution is advantageously achieved. It is particularly preferred for the purpose of the invention that the number of the photodetectors can be adjusted to the range to be spectrally captured.

The absorption element preferably has an elongate shape, the cross section of which is small compared to its length, which corresponds to its extension. The ratio of the cross section dimension to the length is preferably called the aspect ratio. The aspect ratio can for example be 2, 3, 4, 5, 10, 20, or more.

Figure 1:
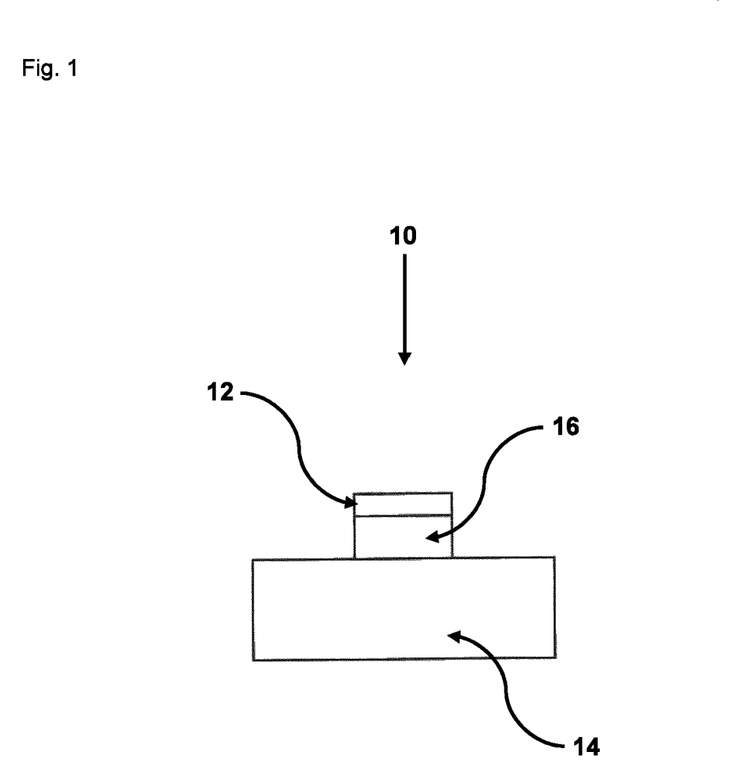
FIG. 1 shows a schematic cross section through a preferred embodiment of the invention

It is preferred for the purpose of the invention that the absorption element is arranged on a substrate. The substrate is advantageously adapted to give the device stability and mechanical strength, such that the device can be used flexibly for various applications. The substrate particularly allows installation of the device or the proposed spectrometer arrangement in a mobile communication device, such as a smartphone or another mobile device. A cladding layer can preferably be provided between the substrate and the absorption element. The resulting exemplary structure of the waveguide is shown in FIG. 1. It may be preferred for the purpose of the invention that the waveguide particularly comprises an absorber. But it may also be preferred that the waveguide comprises both an absorber and a cladding layer, wherein the cladding layer can preferably be significantly thicker than the absorption element of the waveguide. It may be preferred for the purpose of the invention that the substrate is used as a cladding layer. This can be particularly preferred if the refractive index of the substrate is smaller than the refractive index of the absorber. Alternatively, it may be preferred that a sufficiently thick layer is arranged between the absorption element and the substrate which has a thickness of more than a wavelength of the radiation to be detected and a smaller refractive index than the absorber, which layer can be used as the cladding layer for the purpose of the invention. This advantageously prevents the radiation from getting lost, for example by penetrating into the substrate. Providing a cladding layer can therefore prevent radiation from being lost for examining the absorption.

It is particularly preferred for the purpose of the invention that the cladding layer or the material of which the cladding layer is formed is transparent for the radiation coupled into the waveguide. It is further preferred for the purpose of the invention that a refractive index of the cladding layer is considerably greater than the refractive index of the substrate. It may further be preferred for the purpose of the invention that a refractive index of the absorption element is considerably greater than a refractive index of the substrate to facilitate conducting the radiation inside the waveguide. It is preferred for the purpose of the invention that the refractive indices differ sufficiently from each other. The difference of the refractive indices should preferably be in a range from 0.05 to 0.1.

In another aspect, the invention relates to a method for spatially resolved spectral analysis of radiation, the method comprising the following steps:
  a) Provision of a waveguide, wherein the waveguide comprises an absorption element and the absorption element has a varying chemical composition,
  b) provision of a radiation, wherein the radiation is coupled into the waveguide,
  c) absorption of radiation portions by the absorption element depending on the chemical composition of the absorption element and properties of the radiation, wherein charge carriers are released in the absorption element due to the absorption,
  d) detection of the released charge carriers by a photodetector arrangement, wherein the photodetectors are arranged along the waveguide.

The definitions provided of the waveguide and the photodetector arrangement, the technical advantages and surprising effects apply mutatis mutandis to the proposed method.

Furthermore, the method may comprise other method steps for evaluating the information resulting from the released charge carriers. For example, the proposed method may comprise unfolding or deconvolution methods and/or deconvolution method steps. These deconvolution methods can for the purpose of the invention preferably be called unfolding methods. It is preferred that such methods are used as a preferably numeric method step when analyzing the results of measurement as part of a method for spatially resolved spectral analysis of radiation coupled into a waveguide. It is preferred for the purpose of the invention that the photoresponse from which the power spectrum of the radiation is reconstructed manifests itself by the photosignals of the various photodetectors. Calibration steps with which the response of the photodetector array to incident monochromatic radiation can be determined can be used as the basis of unfolding.

The method can preferably be carried out using the proposed waveguide according to the present invention. It may also be preferred to use other waveguides. The feature according to which the absorption element has a varying chemical composition can for the purpose of the invention also preferably described in that the absorption element has a material gradient. It is particularly preferred that the absorption element is characterized by a material gradient to vary the energetic position of an absorption edge along the extension of the absorption element in order to facilitate spatially resolved spectral analysis.

It is further preferred for the purpose of the invention that high-energy radiation portions are absorbed in a front region of the waveguide and low-energy radiation portions are absorbed in a rear region of the waveguide, wherein the absorption is preferably fluid. Due to the locally changing absorption of the radiation, a relation can be established between the place where the absorption occurs and the photon energy of the respective radiation. Preferably there is a connection between the energy and the band gap of the material at the absorption site, as described above. Preferably, the energy of the absorbed radiation influences the amount and/or number of charge carriers released, such that the portion of a specific photon energy in the radiation can be inferred from the determined photocurrent, which is preferably generated by the released charge carriers.

It is preferred for the purpose of the invention that the described features can be essential for the invention either alone or in any combination.

The invention is described with reference to the following figures, wherein:

FIG. 1 shows a schematic cross section through a preferred embodiment of the invention (10). Particularly, FIG. 1 shows a waveguide (10), wherein the embodiment of the invention (10) shown in FIG. 1 comprises a substrate (14), a cladding layer (16), and an absorption element (12). The cladding layer (16) can preferably also be called a "cladding."

FIG. 2 shows a schematic top view of a preferred embodiment of the invention (18). The photodetector (18) comprises a waveguide (10) as well as a series of photodetectors (20) which are arranged on both sides of the waveguide (10). It is preferred for the purpose of the invention that the photodetectors (20) are interconnected, such that their totality forms a photodetector arrangement (18). It is preferred that two photodetectors (20) are arranged opposing each other, wherein a first photodetector (20) of such a photodetector pair can be arranged on the right side of the waveguide (10) and a second photodetector (20) of such a photodetector pair can be arranged on the left side of the waveguide (10). It may also be preferred for the purpose of the invention that a contact of a first photodetector (20) is arranged on the one side of the waveguide (10) and the other contact on the other side of the waveguide (10). It may further be preferred for the purpose of the invention that both contacts of the photodetectors (20) are attached to the same side of the waveguide (10).

It is particularly preferred for the purpose of the invention that the absorption element (12) has a material gradient. The presence of a material gradient means that the chemical composition of the absorption element (12) varies with the extension of the absorption element (12), such that the absorption element (12) has a different chemical composition at different locations. The absorption element (12) preferably comprises a semiconductor alloy having two, three, or four alloy components, wherein the material gradient expresses itself in such a manner that the individual alloy components make up varying proportions of the overall composition at different locations of the absorption element (12). The arrow in FIG. 2 symbolizes in an exemplary manner the incident radiation and the radiation to be analyzed, or its path and/or direction. The three dots in FIG. 2 preferably symbolize that the arrangement of photodetectors (20) continues in this region of the waveguide (10) as well; for the sake of clarity, the respective photodetectors (20) at the two affected sites above and below the waveguide (10) are not shown in FIG. 2, however.

Figure 3:
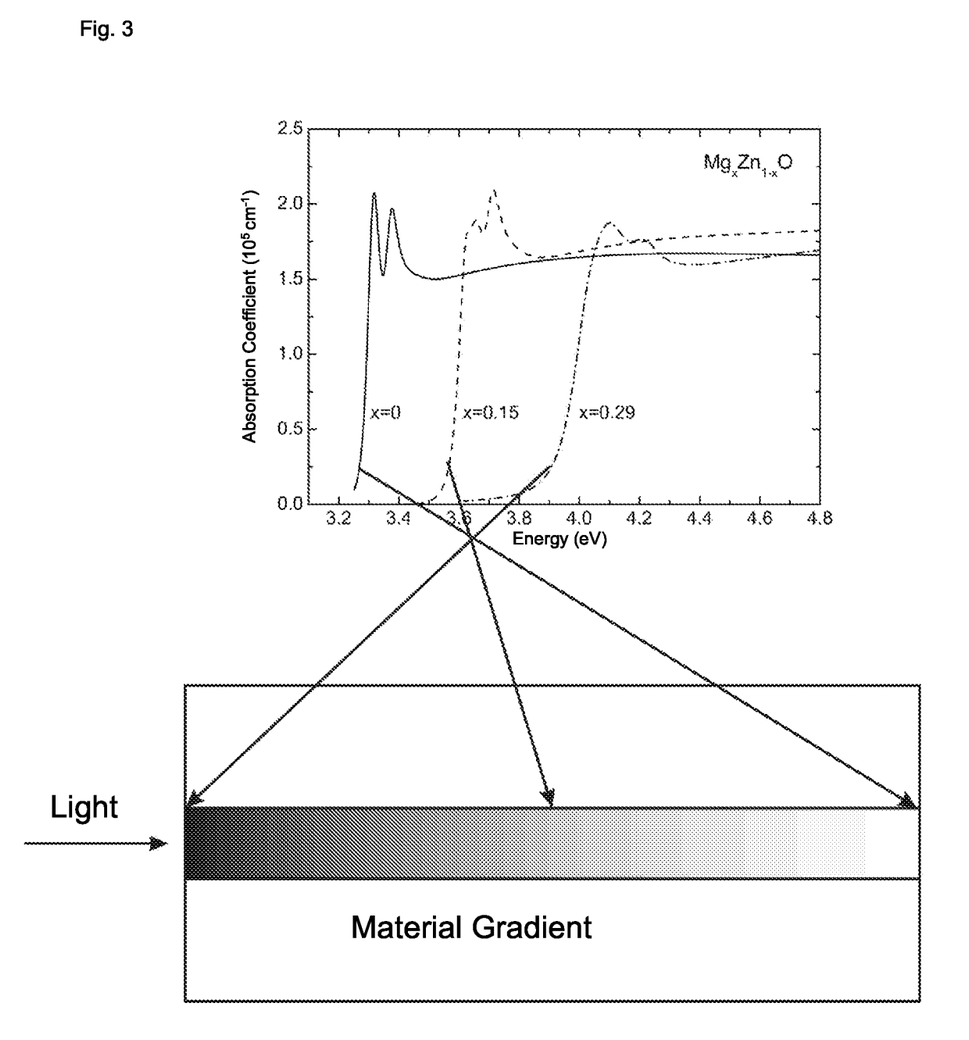
FIG. 3 illustrates an exemplary variation of the spectral position of an absorption edge by means of a variation of the proportions of the alloy components of a semiconductor alloy along the extension of the absorption element

FIG. 3 illustrates a variation of the spectral position of an absorption edge by means of a variation of the proportions of the alloy components of a semiconductor alloy along the extension of the absorption element.

The mode of operation will be described with reference to an example of a (Mg,Zn)O system, wherein the principles explained can be transferred analogously to other semiconductor systems. In the (Mg,Zn)O solid state solution having the chemical formula $Mg_xZn_{1-x}O$, x indicates the Mg content.

FIG. 3 shows at the top the experimental absorption spectra for x=0 (that is, pure ZnO), x=0.15 (that is, $Mg_{0.15}Zn_{0.85}O$), and x=0.29 (that is, $Mg_{0.29}Zn_{0.71}O$) and the respective related spectral shift of the band edge.

The spectral position of the absorption edge for x=0 is at about 3.3 eV. The absorption edge for x=0.15 is at ca. 3.6 eV, and the absorption edge for x=0.29 is slightly widened with a spectral position of ca. 3.9-4.1 eV.

As illustrated in the bottom figure, a substantially continuous material gradient from a front region to a rear region is preferably implemented, at which x continuously varies from 0.0 to 0.29.

A material composition with short-wave or higher-energy absorption edge (in this case: high magnesium content; x=0.29) is on the side of the waveguide or absorption element facing the light, while a material composition with a long-wave or low-energy absorption edge (in this case: low magnesium content; x=0.0) is present in the rear region of the waveguide.

While in the front region photons having an energy of ca. 4 eV (wavelength ca. 310 nm) are absorbed, photons having an energy of ca. 3.3 eV (wavelength ca. 375 nm) are absorbed in the rear region. When the light propagates through the device, the radiation thus increasingly loses high-energy portions, such that the spectrum of the radiation shifts towards lower energies.

As described, the varying absorption of the radiation can be detected by means of the photocurrent signal using an arrangement of photodetectors, and a spatially resolved spectral analysis can be carried out.

LIST OF REFERENCE SYMBOLS

10 Device/waveguide
12 Absorption element
14 Substrate
16 Cladding (layer)
18 Photodetector arrangement
20 Photodetector

The invention claimed is:

1. A device for conducting radiation comprising an absorption element,
   wherein the absorption element has a varying chemical composition along its extension, which composition is characterized by a material gradient in order to vary the energetic position of an absorption edge along the extension of the absorption element,
   characterized in that the absorption element is arranged on a substrate, wherein a cladding layer is present between the substrate and the absorption element of the substrate is used as a cladding layer.

2. The device according to claim 1, characterized in that the absorption element comprises a higher-energy position of the absorption edge in a front region of the device into which the radiation is introduced than in a rear region, such that during a propagation of the radiation through the device, the radiation increasingly loses high-energy portions and the spectrum shifts toward lower energies.

3. The device according to claim 1, characterized in that the absorption element comprises a material which is a binary, ternary, or quaternary semiconductor alloy.

4. The device according to claim 1, characterized in that the material gradient along the extension of the absorption element is varied in a monotonously rising or falling manner, wherein the material gradient preferably shows a linear or square dependency on the position along the extension of the absorption element.

5. The device according to claim 1, characterized in that the material gradient is formed by varying the proportions of the alloy components of a semiconductor alloy along the extension of the absorption element.

6. The device according to claim 1, characterized in that the absorption element comprises a semiconductor alloy of the general form $A_xB_{1-x}$, wherein A and B each represent alloy components and x is the proportion of A in the semiconductor alloy, which is varied along the extension of the absorption element.

7. The device according to claim 1, characterized in that the energy position of the absorption edge along the extension of the absorption element is varied over a spectral region of at least 300 meV, preferably at least 400 meV, at least 500 meV.

8. The device according to claim 1, characterized in that the absorption element is adapted to absorb the radiation along the extension of the device to differing degrees depending on the wavelength of the radiation.

9. The device according to claim 1, characterized in that the absorption element has a length in a range from 50 μm to 20 mm, preferably in a range from 100 μm to 10 mm.

10. The device according to claim 1, characterized in that a material of the absorption element is selected from a group comprising (Mg,Zn)O, (Si,Ge), (Si,Ge)C, $(In,Ga)_2O_3$, $(Al,Ga)_2O_3$, (In,Ga)As, (Al,Ga)As, (In,Ga)N, (Al,Ga)N, (Cd,Zn)O, Zn(O,S), (Al,Ga,In)As, (In, Ga)(As,P), (Al,Ga,In)N, (Mg,Zn,Cd)O, (Al,Ga,In)(As,P), (Al,In,Ga)N, and/or $(Al,Ga,In)_2O_3$.

11. A photodetector arrangement comprising a device according to claim 1, characterized in that a number of N photodetectors are provided along the device, which detectors are in their totality adapted to detect a varying absorption of the radiation by the absorption element along the extension of the device.

12. The photodetector arrangement according to claim 11, characterized in that the photodetector arrangement comprises a data processing device which is adapted to determine the spectrum of the radiation based on the photocurrents measured by the photodetectors.

13. A method for spatially resolved spectral analysis, comprising the following steps:
   a) provision of a waveguide, wherein the waveguide comprises an absorption element and the absorption element has a varying chemical composition along its extension, which composition is characterized by a material gradient in order to vary the energetic position of an absorption edge along the extension of the absorption element, the absorption element is arranged on a substrate, wherein a cladding layer is present between the substrate and the absorption element of the substrate is used as the cladding layer,
   b) provision of a radiation, wherein the radiation is coupled into the waveguide,
   c) absorption of radiation portions by the absorption element depending on the chemical composition of the absorption element and properties of the radiation, wherein charge carriers are released in the absorption element due to the absorption,
   d) detection of the released charge carriers by a photodetector arrangement, wherein a number of N photodetectors are arranged along the waveguide.

* * * * *